US006804637B1

(12) United States Patent
Tokuda et al.

(10) Patent No.: US 6,804,637 B1
(45) Date of Patent: Oct. 12, 2004

(54) METHOD, APPARATUS, AND RECORDING MEDIUM FOR RETRIEVING OPTIMUM TEMPLATE PATTERN

(75) Inventors: Naoyuki Tokuda, Kokubunji (JP); Hiroyuki Sasai, Fussa (JP)

(73) Assignee: Sunflare Co., Ltd., Tokyo (JP)

(*) Notice: Subject to any disclaimer, the term of this patent is extended or adjusted under 35 U.S.C. 154(b) by 798 days.

(21) Appl. No.: 09/597,270

(22) Filed: Jun. 20, 2000

(51) Int. Cl.[7] ............................................. G06F 17/28
(52) U.S. Cl. ............................... 704/2; 704/9; 704/250
(58) Field of Search ................................ 704/2, 7, 234, 704/255

(56) References Cited

U.S. PATENT DOCUMENTS

| 4,507,750 A | * | 3/1985 | Frantz et al. | ............... | 704/277 |
| 4,802,231 A | * | 1/1989 | Davis | ........................ | 382/219 |
| 5,835,087 A | * | 11/1998 | Herz et al. | .................. | 345/810 |

FOREIGN PATENT DOCUMENTS

JP      09-325673      12/1997

OTHER PUBLICATIONS

Abstracts of Japan 09–325673, Patent Abstracts of Japan.

* cited by examiner

Primary Examiner—Nguyen T. Vo
Assistant Examiner—Lamont M Spooner
(74) Attorney, Agent, or Firm—Liniakm Berenato & White (57) ABSTRACT

To retrieve an optimum template pattern in response to an input sentence, a set of templates is arranged in a plurality of template blocks containing an arbitrary number of sentence components, including grammatically correct and/or incorrect components. A score is assigned to every word in the set of templates according to its importance. The candidate template patterns and the input sentence are retrieved, the scores of the matched words are calculated, and the total of the scores of the entire paths are calculated. Optimum level comparison values are then calculated using the score of the matching words as the numerator and the total score as the denominator. The candidate template pattern having the largest optimum level comparison value among optimum level comparison values that provide the largest numerator, is selected as the optimum template pattern. The input sentence is then corrected using this optimum template pattern.

3 Claims, 9 Drawing Sheets

|    | In | Japan | , | are | dotted | with |
|----|----|-------|---|-----|--------|------|
| N1 | 0  | 0     | 0 | 0   | 0      | 0    |
| N2 | 0  | 0     | 0 | 0   | 0      | 0    |
| N3 | 0  | 0     | 0 | 0   | 0      | 0    |
| N4 | 0  | 0     | 0 | 0   | 0      | 0    |
| N6 | 0  | 0     | 0 | 0   | 0      | 0    |
| N7 | 0  | 0     | 0 | 0   | 0      | 0    |
| N8 | 0  | 0     | 0 | 0   | 0      | 0    |
| N9 | 0  | 0     | 0 | 0   | 0      | 0    |
| N5 | 0  | 0     | 0 | 0   | 0      | 0    |

FIG. 6

|    | In | Japan | , | are | dotted | with |
|----|----|----|----|----|----|----|
| N1 | 0  | 0  | 0  | 0  | 0  | 0  |
| N2 | 0 / 1 | 1 / 1 | 1 / 1 | 1 / 1 | 1 / 1 | 1 / 1 |
| N3 | 0  | 0  | 0  | 0  | 0  | 0  |
| N4 | 0  | 0  | 0  | 0  | 0  | 0  |
| N6 | 0  | 0  | 0  | 0  | 0  | 0  |
| N7 | 0  | 0  | 0  | 0  | 0  | 0  |
| N8 | 0  | 0  | 0  | 0  | 0  | 0  |
| N9 | 0  | 0  | 0  | 0  | 0  | 0  |
| N5 | 0  | 0  | 0  | 0  | 0  | 0  |

FIG. 7

|    | In | Japan | , | are | dotted | with |
|----|----|----|----|----|----|----|
| N1 | 0  | 0  | 0  | 0  | 0  | 0  |
| N2 | 0 / 1 | 1 / 1 | 1 / 1 | 1 / 1 | 1 / 1 | 1 / 1 |
| N3 | 0  | 0  | 0  | 0  | 0  | 0  |
| N4 | 0  | 0  | 0  | 0  | 0  | 0  |
| N6 | 1 / 1 | 1 / 1 | 1 / 1 | 1 / 1 | 1 / 1 | 1 / 1 |
| N7 | 0  | 0  | 0  | 0  | 0  | 0  |
| N8 | 0  | 0  | 0  | 0  | 0  | 0  |
| N9 | 0  | 0  | 0  | 0  | 0  | 0  |
| N5 | 0  | 0  | 0  | 0  | 0  | 0  |

FIG. 8

|    | In | Japan | , | are | dotted | with |
|----|----|-------|---|-----|--------|------|
| N1 | 0  | 0     | 0 | 0   | 0      | 0    |
| N2 | 0 1| 1 1   | 1 1 | 1 1 | 1 1  | 1 1  |
| N3 | 0 2| 1 2   | 1 2 | 1 2 | 1 2  | 1 2  |
| N4 | 0  | 0     | 0 | 0   | 0      | 0    |
| N6 | 1 1| 1 1   | 1 1 | 1 1 | 1 1  | 1 1  |
| N7 | 0  | 0     | 0 | 0   | 0      | 0    |
| N8 | 0  | 0     | 0 | 0   | 0      | 0    |
| N9 | 0  | 0     | 0 | 0   | 0      | 0    |
| N5 | 0  | 0     | 0 | 0   | 0      | 0    |

FIG. 9

|    | In | Japan | , | are | dotted | with |
|----|----|-------|---|-----|--------|------|
| N1 | 0  | 0     | 0 | 0   | 0      | 0    |
| N2 | 0 1| 1 1   | 1 1 | 1 1 | 1 1  | 1 1  |
| N3 | 0 2| 1 2   | 1 2 | 1 2 | 1 2  | 1 2  |
| N4 | 0 4| 1 4   | 1 4 | 1 4 | 3 4  | 3 4  |
| N6 | 1 1| 1 1   | 1 1 | 1 1 | 1 1  | 1 1  |
| N7 | 0  | 0     | 0 | 0   | 0      | 0    |
| N8 | 0  | 0     | 0 | 0   | 0      | 0    |
| N9 | 0  | 0     | 0 | 0   | 0      | 0    |
| N5 | 0  | 0     | 0 | 0   | 0      | 0    |

FIG. 10

|    | In | Japan | , | are | dotted | with |
|----|----|----|----|----|----|----|
| N1 | 0 | 0 | 0 | 0 | 0 | 0 |
| N2 | 0 / 1 | 1 / 1 | 1 / 1 | 1 / 1 | 1 / 1 | 1 / 1 |
| N3 | 0 / 2 | 1 / 2 | 1 / 2 | 1 / 2 | 1 / 2 | 1 / 2 |
| N4 | 0 / 4 | 1 / 4 | 1 / 4 | 1 / 4 | 3 / 4 | 3 / 4 |
| N6 | 1 / 1 | 1 / 1 | 1 / 1 | 1 / 1 | 1 / 1 | 1 / 1 |
| N7 | 0 | 0 | 0 | 0 | 0 | 0 |
| N8 | 0 | 0 | 0 | 0 | 0 | 0 |
| N9 | 0 | 0 | 0 | 0 | 0 | 0 |
| N5 | 0 / 5 | 1 / 5 | 1 / 5 | 1 / 5 | 3 / 5 | 4 / 5 |

FIG. 11

|    | In | Japan | , | are | dotted | with |
|----|----|----|----|----|----|----|
| N1 | 0 | 0 | 0 | 0 | 0 | 0 |
| N2 | 0 / 1 | 1 / 1 | 1 / 1 | 1 / 1 | 1 / 1 | 1 / 1 |
| N3 | 0 / 2 | 1 / 2 | 1 / 2 | 1 / 2 | 1 / 2 | 1 / 2 |
| N4 | 0 / 4 | 1 / 4 | 1 / 4 | 1 / 4 | 3 / 4 | 3 / 4 |
| N6 | 1 / 1 | 1 / 1 | 1 / 1 | 1 / 1 | 1 / 1 | 1 / 1 |
| N7 | 1 / 2 | 2 / 2 | 2 / 2 | 2 / 2 | 2 / 2 | 2 / 2 |
| N8 | 0 | 0 | 0 | 0 | 0 | 0 |
| N9 | 0 | 0 | 0 | 0 | 0 | 0 |
| N5 | 0 / 5 | 1 / 5 | 1 / 5 | 1 / 5 | 3 / 5 | 4 / 5 |

FIG. 12

|    | In | Japan | , | are | dotted | with |
|----|----|----|----|----|----|----|
| N1 | 0 | 0 | 0 | 0 | 0 | 0 |
| N2 | 0  1 | 1  1 | 1  1 | 1  1 | 1  1 | 1  1 |
| N3 | 0  2 | 1  2 | 1  2 | 1  2 | 1  2 | 1  2 |
| N4 | 0  4 | 1  4 | 1  4 | 1  4 | 3  4 | 3  4 |
| N6 | 1  1 | 1  1 | 1  1 | 1  1 | 1  1 | 1  1 |
| N7 | 1  2 | 2  2 | 2  2 | 2  2 | 2  2 | 2  2 |
| N8 | 1  3 | 2  3 | 3  3 | 3  3 | 3  3 | 3  3 |
| N9 | 0 | 0 | 0 | 0 | 0 | 0 |
| N5 | 0  5 | 1  5 | 1  5 | 1  5 | 3  5 | 4  5 |

FIG. 13

|    | In | Japan | , | are | dotted | with |
|----|----|----|----|----|----|----|
| N1 | 0 | 0 | 0 | 0 | 0 | 0 |
| N2 | 0  1 | 1  1 | 1  1 | 1  1 | 1  1 | 1  1 |
| N3 | 0  2 | 1  2 | 1  2 | 1  2 | 1  2 | 1  2 |
| N4 | 0  4 | 1  4 | 1  4 | 1  4 | 3  4 | 3  4 |
| N6 | 1  1 | 1  1 | 1  1 | 1  1 | 1  1 | 1  1 |
| N7 | 1  2 | 2  2 | 2  2 | 2  2 | 2  2 | 2  2 |
| N8 | 1  3 | 2  3 | 3  3 | 3  3 | 3  3 | 3  3 |
| N9 | 1  5 | 2  5 | 3  5 | 3  5 | 3  5 | 3  5 |
| N5 | 0  5 | 1  5 | 1  5 | 1  5 | 3  5 | 4  5 |

FIG. 14

|    | In | Japan | , | are | dotted | with |
|----|----|----|----|----|----|----|
| N1 | 0 | 0 | 0 | 0 | 0 | 0 |
| N2 | 0 1 | 1 1 | 1 1 | 1 1 | 1 1 | 1 1 |
| N3 | 0 2 | 1 2 | 1 2 | 1 2 | 1 2 | 1 2 |
| N4 | 0 4 | 1 4 | 1 4 | 1 4 | 3 4 | 3 4 |
| N6 | 1 1 | 1 1 | 1 1 | 1 1 | 1 1 | 1 1 |
| N7 | 1 2 | 2 2 | 2 2 | 2 2 | 2 2 | 2 2 |
| N8 | 1 3 | 2 3 | 3 3 | 3 3 | 3 3 | 3 3 |
| N9 | 1 5 | 2 5 | 3 5 | 3 5 | 3 5 | 3 5 |
| N5 | 1 6 | 2 6 | 3 6 | 4 6 | 4 6 | 4 5 |

METHOD, APPARATUS, AND RECORDING MEDIUM FOR RETRIEVING OPTIMUM TEMPLATE PATTERN

BACKGROUND OF THE INVENTION

1. Field of the Invention

The present invention relates to a method, apparatus, and recording medium for retrieving an optimum template pattern used in, for example, correcting and evaluating a translation, and in particular to a method, apparatus, and recording medium allowing an optimum template pattern which is most appropriate for any given input sentence to be obtained.

2. Description of the Prior Art

In technical translator training courses, a method is generally used in which students send their assigned translations to the tutoring center, where the translations are corrected, evaluated, and sent back to the students, and the students review the corrections and know their grade.

Conventionally, a method has been used to correct translations in which a large number of translations sent back from students are distributed among a plurality of tutors and each of the tutors manually corrects errors in the translations. However, there are problems with this method: the manual correction requires much time, and besides that, since it is not necessarily easy to employ tutors having ability at a certain level or higher, the corrections may vary depending on the tutors.

The inventors previously proposed a language translation correction support apparatus that provides a result nearly equal to that from manual correction by experts, as disclosed in Japanese Patent Laid-Open No. 9-325673 specification.

BRIEF SUMMARY OF THE INVENTION

Object of the Invention

In the translation correction support apparatus previously proposed by the inventors, a plurality of template patterns are provided, each of which corresponds to a model translation, a template pattern which matches student's translation is determined, the translation is regarded as templates similar to the matching template pattern, then differences between each template and the student's translation are determined to produce resulting corrections. Very precise corrections can be obtained by this apparatus if the student's translations have only few errors.

However, if the levels of student's translations widely vary as in, for example, general language schools, it is impossible to provide numerous template patterns corresponding to model translations in consideration of all possible variations. As a result, it often occurs that a translation matches none of the translation patterns of the model translation provided beforehand and, at worst, no template pattern of the model translation corresponding to the translation can be presented.

Such a problem occurs not only in the translation correction support apparatus, but also often in information retrieval in which certain information is retrieved based on a query in an information retrieval system using the Internet, for example.

The above mentioned problem arises from the fact that template patterns for a model sentence (model translation) corresponding to input sentences (student's translations) are provided beforehand and a template pattern that matches a given input sentence is searched from among those template patterns. It is expected that, if each time an input sentence is provided a template pattern for an appropriate model translation is constructed which matches the input sentence, the most appropriate model translation template pattern for the input sentence may be obtained.

The present invention was devised based on the above-mentioned insight and it is an object of the present invention to provide a method, apparatus, and recording medium for optimum template pattern retrieval, wherein the same template pattern as input sentence's template pattern intended by the person who has input that sentence can be obtained as the optimum template pattern for a model sentence.

SUMMARY OF THE INVENTION

To achieve the above-mentioned object, the present invention provides a method for retrieving an optimum template pattern, by an Finite State Automaton scheme wherein a set of templates for a model sentence (model translation) is provided beforehand, the set of templates being constructed by arranging a plurality of template blocks containing an arbitrary number of sentence components called states including grammatically correct and/or erroneous components, and a candidate template pattern which is most appropriate for a given input sentence is selected from all the candidate template patterns which can be constructed from the set of template; said method characterized by: assigning scores to all the words in the set of templates according to their importance; calculating an optimum level comparison value of each of all the candidate template pattern by taking the total of the scores of all the words used in each candidate template pattern as the denominator and the total of the scores of words in each candidate template pattern which match words in the input sentence as the numerator; and determining as the optimum template pattern a candidate template pattern having the largest optimum level comparison value among optimum level values which provide the largest numerator.

That is, according to the present invention, a set of templates is provided beforehand which is constructed by arranging a plurality of template blocks containing an arbitrary number of sentence components called states including grammatically correct and/or erroneous components. From the set of templates, a large number of candidate template patterns corresponding to a given input sentence can be constructed by linking any one of sentence components in a higher order template block with any one of sentence components in the next higher order template block in sequence. Scores are assigned to all the words in the set of templates according to their importance. Thus, an optimum level comparison value of each of all the candidate template patterns is calculated by taking the total of the scores of all the words used in each candidate template pattern as the denominator and the total of the scores of words in each candidate template pattern which match words in the input sentence as the numerator to determine a candidate template pattern having the largest optimum level comparison value among optimum level values which provide the largest numerator, thereby the same template pattern as input sentence's template pattern intended by the person who input that sentence can be obtained as the optimum template pattern for the model sentence (model translation).

The present invention is further characterized in that: template set storage means for storing a set of templates for a model sentence, the set of templates being constructed by arranging a plurality of template blocks containing an arbitrary number of sentence components called states including grammatically correct and/or erroneous components; input sentence storage means for storing an input sentence; candidate template pattern retrieval means for comparing each of the template blocks in the set of templates with the input sentence and retrieving all the candidate template patterns which can be constructed from the set of templates; candidate template pattern storage means for storing the retrieved candidate template patterns; word score storage means for storing scores assigned to all the words in the set of template according to their importance by associating the scores with the words; matching word retrieval means for retrieving a word which matches a word in the input sentence; total score calculation means for calculating total of the scores of all the words used in each of the candidate template patterns; matching word score calculation means for calculating total of the scores of words in each candidate template pattern which match words in the input sentence; optimum level comparison value calculation means for calculating an optimum level comparison value by taking the total of the scores of all the words in each of the candidate template pattern as the denominator and the total of the scores of words in each candidate template pattern which match words in the input sentence as the numerator; and optimum template pattern determination means for comparing the optimum level comparison values of the candidate template patterns to determine a candidate template pattern having the largest optimum level comparison value among optimum level comparison values which provide the largest numerator as the optimum template pattern are provided. Because each template block in the set of templates is compared with the input sentence and all the candidate template patterns which can be constructed from the set of templates are retrieved by the candidate template pattern retrieval means, candidate template pattern corresponding to any given input sentence can be obtained. In addition, because the scores of words are taken into consideration when obtaining the optimum template pattern among a plurality of candidate template patterns, a candidate template pattern containing a larger number of important words is selected as the optimum template pattern if the input sentence contains important words having a high score, thus the same template pattern as that of the input sentence which is intended by the person who inputted the sentence can be determined as the optimum template pattern.

The present invention is further characterized in that it causes a computer to perform processes of: storing a set of templates for a model sentence in a memory area, the set of templates being constructed by arranging a plurality of template blocks containing an arbitrary number of sentence components called states including grammatically correct and/or erroneous components; storing an input sentence in the memory area; storing in the memory area scores assigned to all the words in the set of template according to their importance by associating the scores with the word; and, using an optimum level comparison value of each of all the candidate template patterns which is calculated by taking the total of the scores of all the words used in each candidate template pattern as the denominator and the total of the scores of words in each candidate template pattern which matches words in the input sentence as the numerator to determine a candidate template pattern having the largest optimum level comparison value among optimum level values which provide the largest numerator. The processes mentioned above allows the same template pattern as input sentence's template pattern intended by the person who inputted that sentence to be obtained as the optimum template pattern for a model sentence, without providing the template pattern for the model sentence beforehand.

DETAILED DESCRIPTION OF THE PREFERRED EMBODIMENTS

The present invention will be described below with reference to the drawings.

Figure 1:
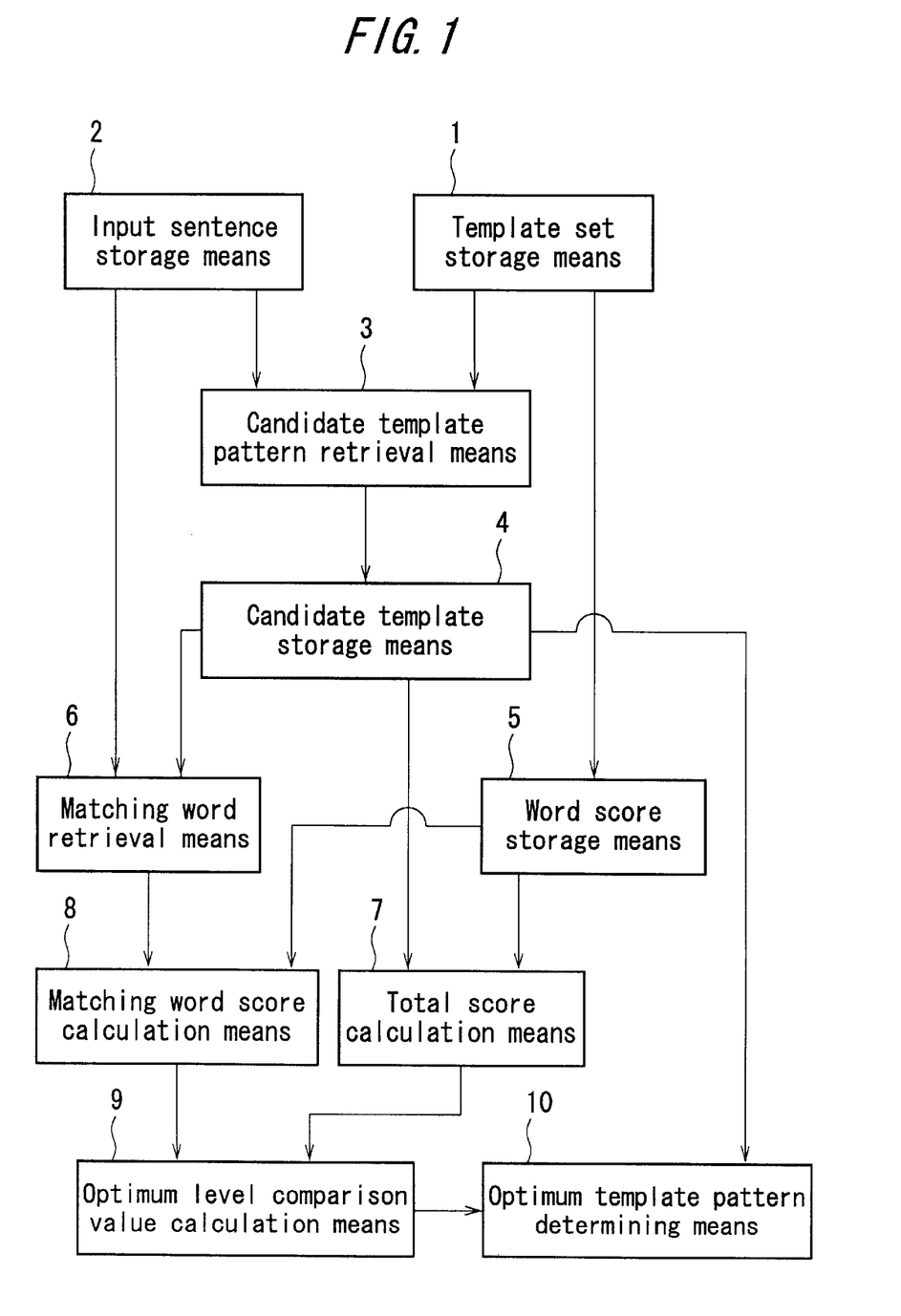
FIG. 1 is a general block diagram of an optimum template pattern retrieval apparatus according to one embodiment of the present invention.
Figure 2:
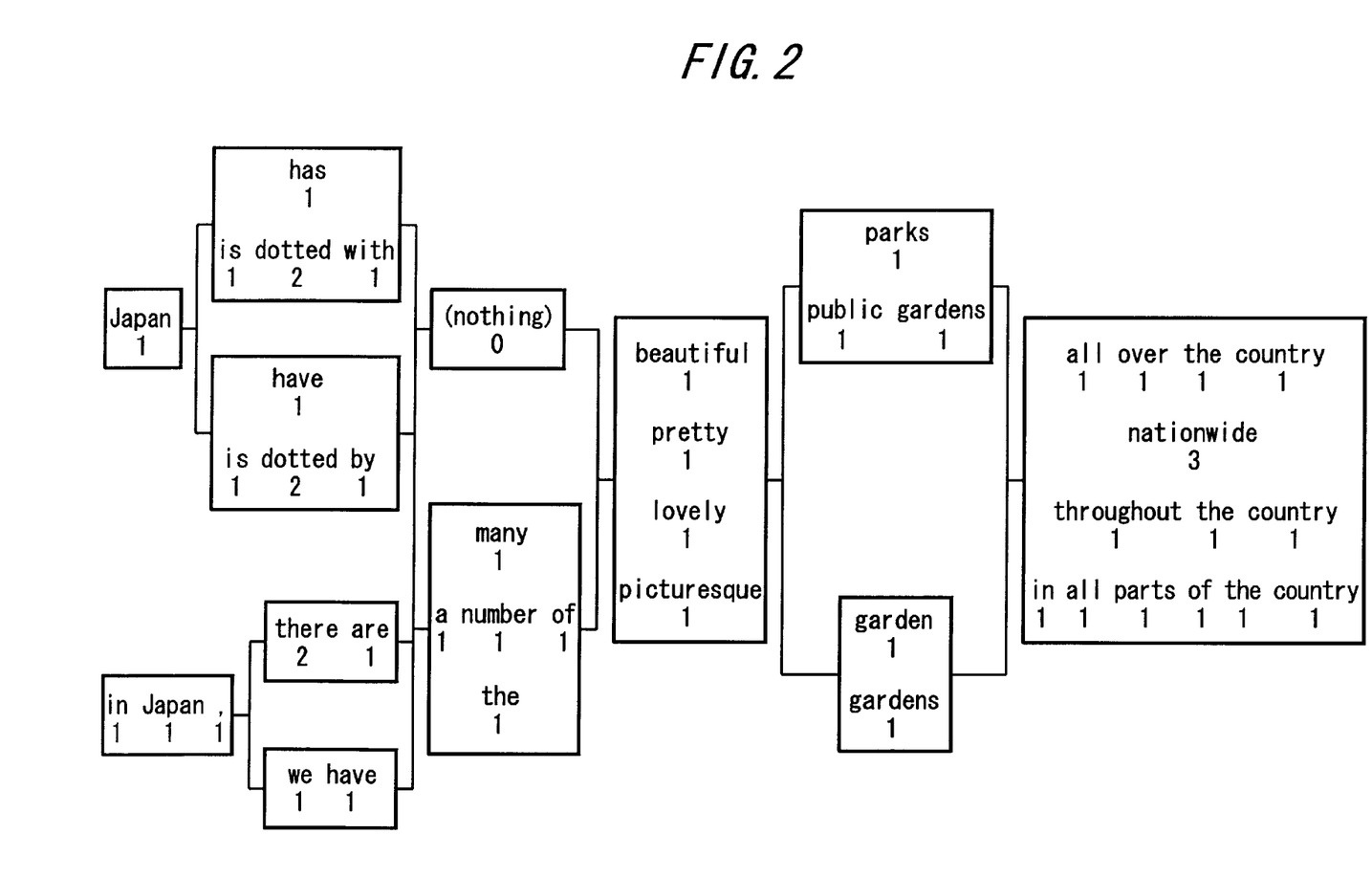
FIG. 2 is an explanatory drawing of an example of a set of templates used in the apparatus shown in FIG. 1.

FIG. 1 shows an optimum template pattern retrieval apparatus according to one embodiment of the present invention. This apparatus includes template set storage means 1 for storing a set of templates for a model sentence as shown in FIG. 2, input sentence storage means 2 for storing an input sentence, and candidate template pattern retrieval means 3. The candidate template pattern retrieval means 3 is configured so as to compare the input sentence with each template block of the set of templates, which will be described later in detail, and retrieve all the candidate template patterns which can be constructed from the templates. The retrieved candidate template patterns are stored in candidate template pattern storage means 4.

The set of templates has a plurality of template blocks containing an arbitrary number of sentence components consisting of a word(s)/phrase(s), as shown in FIG. 2. From the set of templates, a large number of candidate template patterns corresponding to a given input sentence can be constructed by linking any one of sentence components in a higher order template block with any one of sentence components in the next higher order template block in sequence.

For example, from the set of templates shown in FIG. 2, candidate template patterns such as "Japan has beautiful parks nationwide." and "Japan is dotted with lovely public gardens all over the country."

may be constructed.

The set of templates is constructed by using expertise of expert translators, identifying a core component of a translation during correcting translations with the help of past correction samples to decompose a model translation into sentence components consisting of a word(s)/phrase(s), grouping an arbitrary number of sentence components of an equal level in terms of rules of grammar into template blocks, and arranging the template blocks.

Each of the template blocks is constructed by including a syntactically or semantically misused word(s)/phrase(s) besides correctly used ones, thereby candidate template patterns corresponding to an input sentence which would be impossible in ordinary circumstances can also be constructed.

Scores are assigned to all the word in the set of templates according to their importance as shown in FIG. 2. The scores are associated with the words and stored in word score storage means 5 shown in FIG. 1.

For example, in the set of templates shown in FIG. 2, score "1" is assigned to most of the words, except for the words "dotted" and "there" to which score "2", two times larger than that of the most words, is assigned, and "nationwide" to which score "3", three times larger than that of the most words, is assigned. That is, the words "dotted", "there", and "nationwide" are set up as important words having two or three times more important than the other words.

Here, the important words are set up for, for example, emphasizing a sentence pattern which a tutor wants the students to learn without fail in the case where the tutor corrects the student's translations (input sentences). In such a case, the tutor would guide the students so that they use that sentence pattern to translate an assigned sentence during the course and the students would try to use that sentence pattern to translate the sentence. It is apparent that, when a student used the sentence pattern to translate the assigned sentence, it would be an evaluation which is suited to the intent of the student who presented the translation (input sentence) to the tutor if the tutor uses a template pattern conforming to the sentence pattern to evaluate the translation.

Thus, in the present invention, when a student used such a sentence pattern for translation, a template pattern conforming to the sentence pattern can be selected as the optimum template pattern, as will be described later in detail.

While in the set of templates shown in FIG. 2 the words "dotted", "there", and "nationwide" are set up as important words, the scores of all the words in the set of templates may be "1."

The candidate template patterns constructed as described above are searched for a word matching the input sentence in matching word retrieval means 6 shown in FIG. 1. The total of the scores of all the words used in each of the candidate template patterns is calculate in total score calculation means 7 and the total of the scores of words in each candidate template pattern which match words in the input sentence is calculated in matching word score calculation means 8. Then, a comparison between these totals is made to calculate the optimum level comparison value of each candidate template pattern in optimum level comparison value calculation means 9.

That is, the optimum level comparison value is calculated using the total of the scores of all the words in each candidate template pattern as the denominator and the total of the scores of words in each candidate template pattern which matches words in the input sentence as the numerator in the optimum level comparison value calculation means 9. The optimum level comparison values of the candidate template patterns are compared with each other in optimum template pattern determination means 10 as shown in FIG. 1 and a candidate template pattern having the largest optimum level comparison value among the optimum level comparison values which provide the largest numerator is determined as the optimum template pattern. Because, besides the total of the scores of matching words, the total of the scores of all the words in each candidate template pattern is taken into consideration, a candidate template pattern having a closer similarity to the input sentence can be determined as the optimum template.

Figure 3:
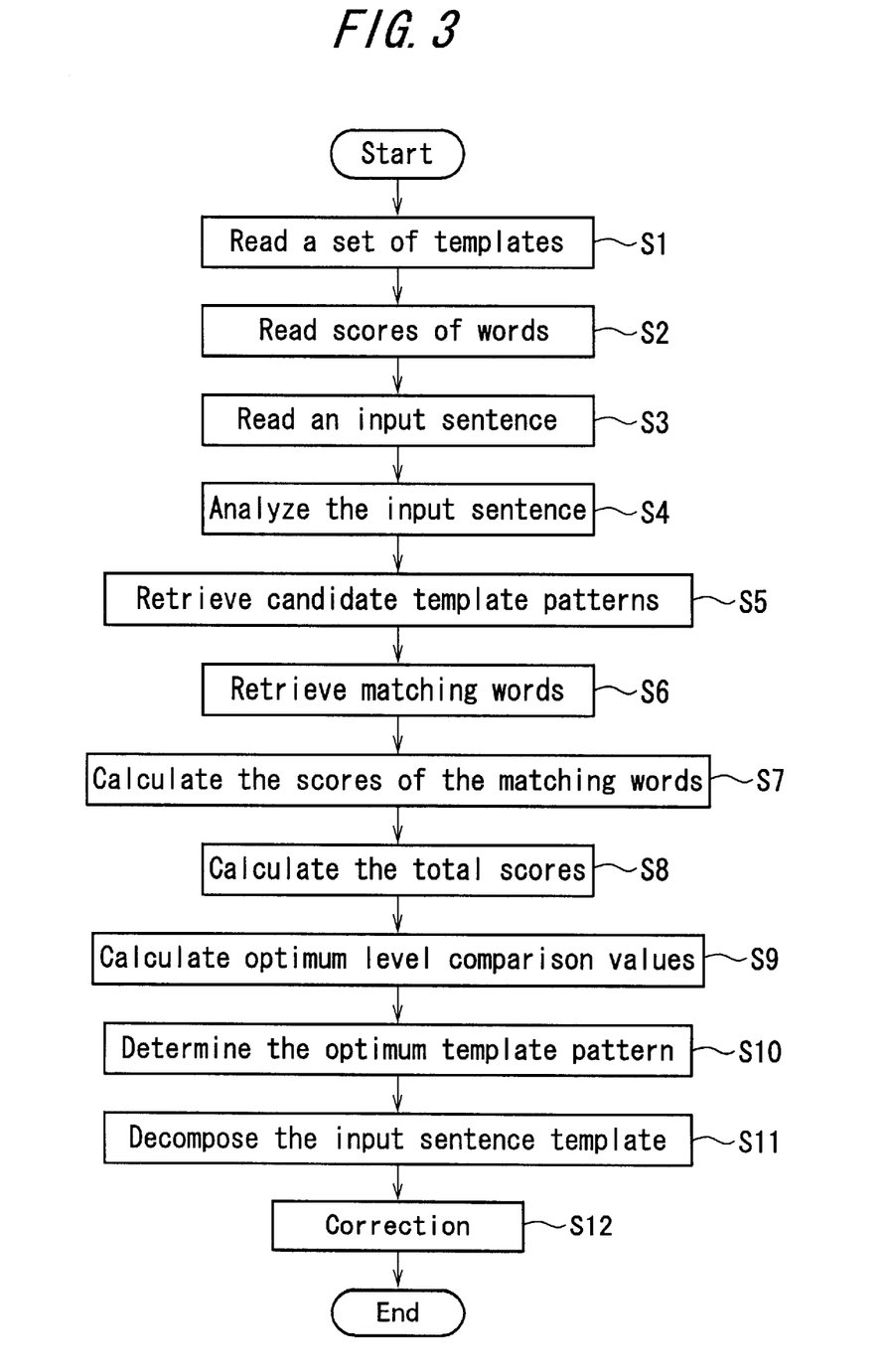
FIG. 3 is a flowchart of an optimum template pattern retrieval method performed by the apparatus shown in FIG. 1.

FIG. 3 is a flowchart showing a method for retrieving an optimum template pattern in the optimum template pattern retrieval apparatus described above. This method will be described below.

First, a set of templates for a model translation corresponding to a given input sentence is provided beforehand, and at step S1, the set of template is read. Typically, the set of templates is stored in a computer by using Finite State Automaton (FSA).

Next, scores assigned to all the words in the set of templates according to their importance are read into the computer at step S2.

Then, the input sentence is read at step S3 and analyzed at step S4.

In this analysis of the input sentence, in the case of Japanese-into-English translation in the above-mentioned example, for example, key pattern checking by using a key pattern for determining whether basic usage is correctly conformed, classifying parts of speech of every word in the input sentence by using a built-in dictionary, and parsing by a parsing program are performed sequentially, as described in above mentioned Japanese Patent Laid-Open No. 9-325673 specification.

Then, at step S5, the input sentence is compared with each template block in the set of templates to retrieve all the candidate template patterns that can be constructed.

Then, words in each candidate template pattern which match words in the input sentence are retrieved at step S6 and the total of the scores of matching words in each template pattern is calculated at step S7.

Then, the total of the scores of all the words used in each of the candidate template patterns is calculated at step S8 and the optimum level comparison value of each candidate template pattern is calculated at step S9.

Specifically, the optimum level comparison value is calculated by taking the total score calculated at step S8 as the denominator and using the total of the scores of the matching words calculated at step S7 as the numerator. That is, the value is produced by dividing the total of the scores of the matching words by the total of the scores of all the words in each candidate template pattern.

Then, at step S10, the optimum level comparison values of the candidate template patterns are compared with each other to determine, as the optimum template pattern, a template pattern providing the largest optimum level comparison value among the optimum level comparison values which provide the largest total of the scores of the matching words calculated at step S7.

For example, if an assigned sentence

"日本には、全国的に美しい庭が多い。"

is given and a translation

"In Japan, are dotted with lovely public gardens nationwide."

is input by a student (a person inputting a translation (input sentence), then a template pattern "Japan is dotted with lovely public gardens nationwide."

is determined as the optimum template pattern among a large number of candidate template patterns which can be constructed from the set of templates shown in FIG. 2, according to the present invention.

Then, for the part

"In Japan, are dotted with"

in the student's translation, how an optimum template pattern is determined as the optimum among a large number of candidate templates which can be constructed from the set of templates shown in FIG. 2 will be specifically described below.

Here, suppose that, in response to the input translation

"In Japan, are dotted with", candidate template patterns

"Japan is dotted with"

and

Figure 4:
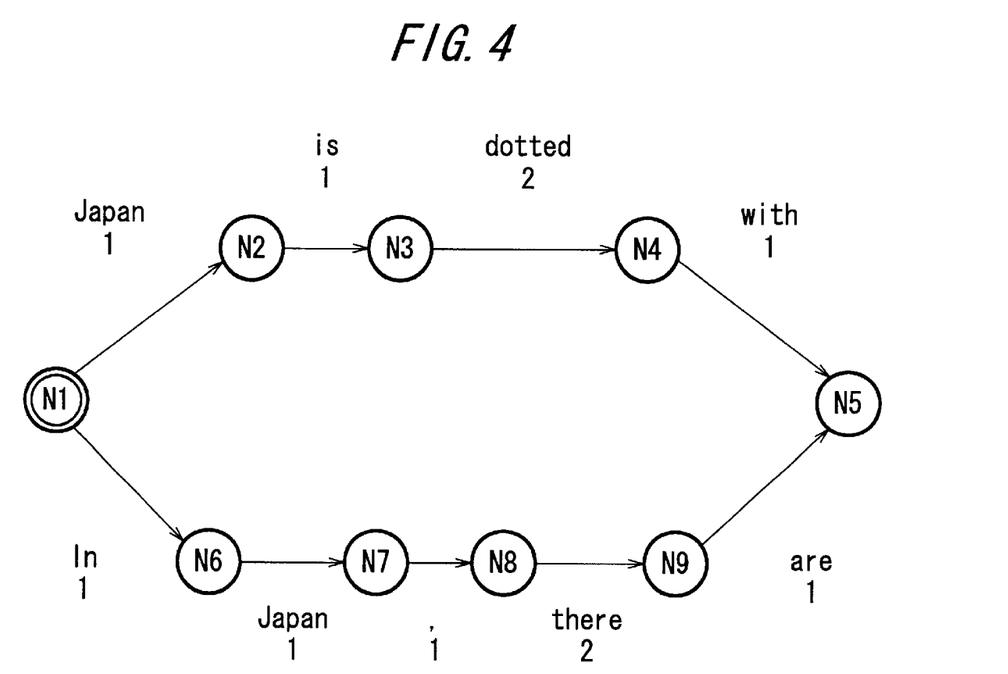
FIG. 4 is an explanatory drawing showing an example of a digraph.

"In Japan, there are" are constructed from the set of the templates shown in FIG. 2. Then, a digraph as shown in FIG. 4 can be created.

Suppose the nodes (states) of this digraph are sorted as N1, N2, N3, N4, N6, N7, N8, N9, N5, and each node is matched with the input translation.

Figure 5:
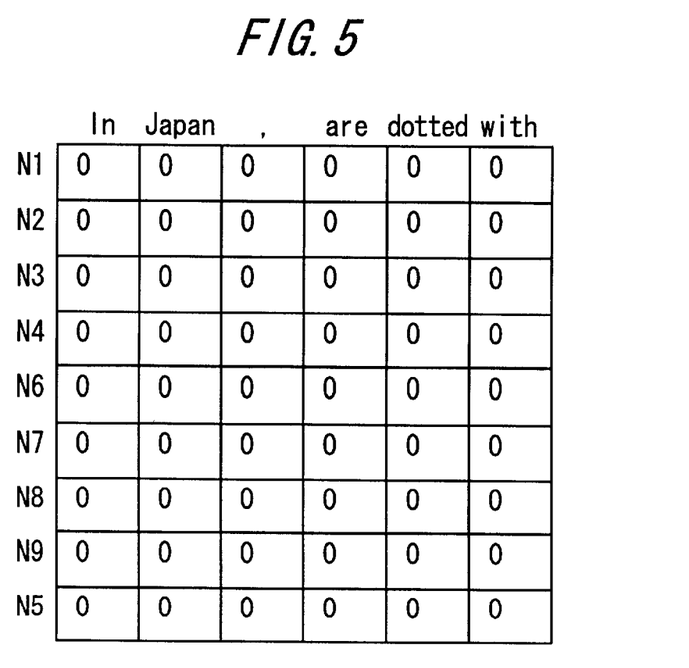
FIG. 5 is a table showing an initial state for matching nodes in FIG. 4 with an input sentence.

FIG. 5 shows the initial state. In this state, arc (N1, N2), i.e. "Japan", arc (N1, N6), i.e. "In", arc (N2, N3), i.e. "is", arc (N3, N4), i.e. "dotted", arc (N4, N5), i.e. "with", arc (N6, N7), i.e. "Japan", arc (N7, N8), i.e. ",", arc (N8, N9), i.e. "there", and arc (N9, N5), i.e. "are" are matched with each words in the input translation in sequence.

First, matching arc (N1, N2) with the input translation will be described with reference to FIG. 6.

(1) Arc (N1, N2) is matchedwith "In" in the input translation. Since they do not match, the values of item (N2, "In") and item (N1, "In") are checked. Since both of them are"0", item (N2, "In") is kept unchanged and its back link is also kept unchanged (since initially the back link of item (N1, "In") has not been set, it is set to (N1, "In") at this point). Arcs in FIG. 6 represent back links.

A back link is set because, in this matching method, which path a character string of the optimum template exists in is unknown until all the matching steps from start node N1 to end node N5 shown in FIG. 4 are completed. Specifically, if it is found out after the matching process for end node 5 in FIG. 4 is completed that the optimum template pattern is on arc (N4, N5) side, it is required to be known that node 4 is a character string in the path leading to start node N1, through N4→N3→N2→N1. The back link indicates this path.

(2) Arc (N1, N2) is matched with "Japan" in the input translation. Since they match, the values of item (N2, "Japan") (=0), item (N2, "In") (=0), item (N1, "Japan") (=0), and item (N1, "In")+1 (=1, where "+1" means that the score of "Japan" in FIG. 4 is added) are checked and the largest value among them is selected for the value of item (N2, "Japan"). This numeric value is used as the numerator in calculating the above-mentioned optimum level comparison value. Thus, now item (N2, "Japan")=1 and the back link is linked to item (N1, "In") selected as the largest. (here, N1 is the start node of arc (N1, N2)).

Figure 6:
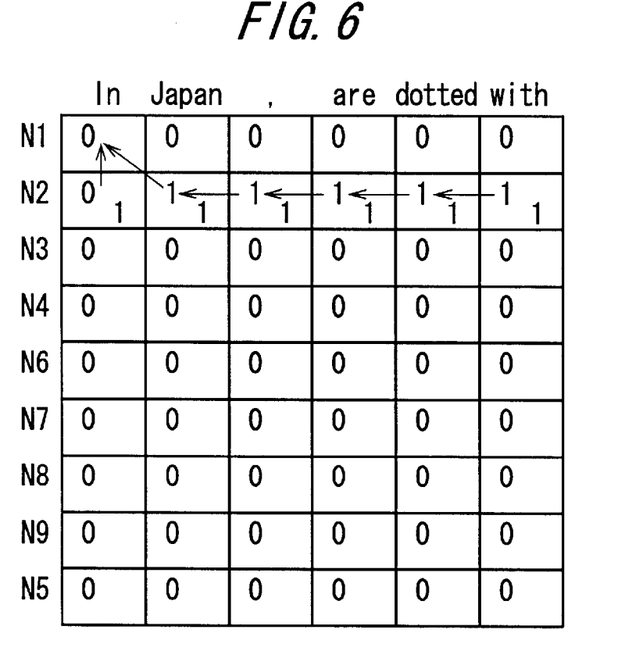
FIG. 6 is a table showing matching the input sentence with the template patterns terminating by an arc (N1, N2)

In the table shown in FIG. 6, the number "1" in the lower right corner of each cell in row N2 represents the total of the scores of words contained in the path from start node N1 to node N2 in FIG. 4 and is used as the denominator in calculating the above-mentioned optimum level comparison value.

(3) Arc (N1, N2) is matched with "," in the input translation. Since they do not match, the values item (N2, ",") (=0), item (N2, "Japan") (=1), and item (N1,",") (=0) are checked and the largest value among them is selected.

Thus, now item (N2, ",")=1 and the back link is linked to item (N2, "Japan") selected as the largest.

(4) Arc (N1, N2) is matched with "are" in the input translation. Since they do not match, the values of item (N2, "are") (=0), item (N2, ",") (=1), and item (N1, "are") (=0) is checked and the largest one is selected. Thus, now item (N2, "are")=1 and the back link is linked to item (N2, ",") selected as the largest.

(5) Arc (N1, N2) is matched with "dotted" in the input translation. Since they do not match, the values of item (N2, "dotted") (=0), item (N2, "are") (=1), and item (N1, "dotted") (=0) are checked and the largest value among them is selected. Thus, now item (N2, "dotted")=1 and the back link is linked to item (N2, "are") selected as the largest.

(6) Arc (N1, N2) is matched with "with" in the input translation. Since they do not match, the values of item (N2, "with") (=0), item (N2, "dotted") (=1), and item (N1, "with") (=0) are checked and the largest one is selected. Thus, now item (N2, "with")=1 and the back link is linked to item (N2, "dotted") selected as the largest.

Next, matching arc (N1, N6) with the input translation will be described with reference to FIG. 7.

(1) First, arc (N1, N6) is matched with "In" in the input translation. Since they match, the values of item (N6, "In") (=0) and item (N1, "In") (=1, where "+1" means that the score of "In" in FIG. 4 is added) are checked and the largest one is selected for the value of item (N6, "In"). Thus, now item (N6, "In")=1 and the back link is linked to item (N1, "In") selected as the largest.

Figure 7:
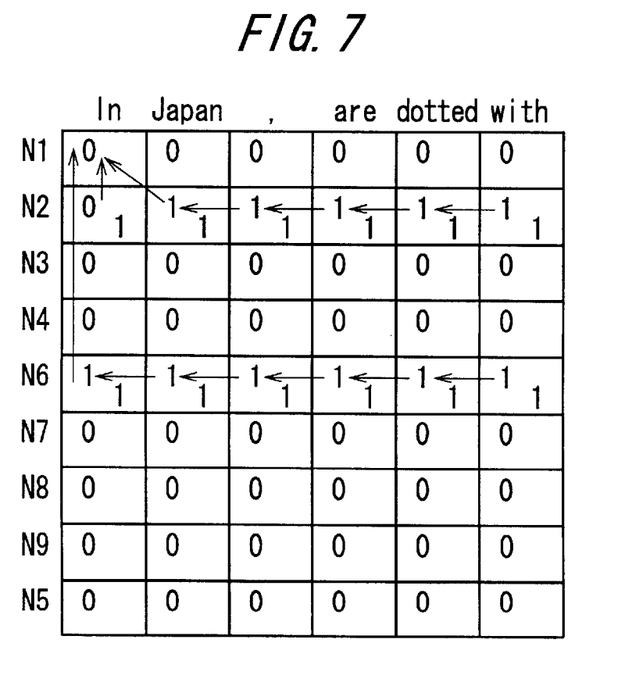
FIG. 7 is a table showing matching the input sentence with the template patterns terminating by an arc (N1, N6)

In the table shown in FIG. 7, the number "1" in the lower right corner of each cell in row N6 represents the total of the scores of words contained in the path from start node N1 to node N6 in FIG. 4, that is, the score of "In".

(2) Next, arc (N1, N6) is matched against "Japan" in the input translation. Since they do not match, the values of item (N6, "Japan) (=0), item (N6, "In") (=1), and item (N1, "Japan") (=0) are checked and the largest one is selected. Thus, now item (N6, "Japan")=1 and the back link is linked to item (N6, "In") selected as the largest.

(3) Arc (N1, N6) is matched with "," in the input translation. Since they do not match, the values of item (N6, ",") (=0), item (N6, "Japan") (=1), and item (N1, ",") (=0) are checked and the largest one is selected. Thus, now item (N6, ",") =1 and the back link is linked to item (N6, "Japan") selected as the largest.

(4) Arc (N1, N6) is matched with "are" in the input translation. Since they do not match, the values of item (N6, "are") (=0), item (N6, ",") (=1), and item (N1, "are") (=0) are checked and the largest one is selected. Thus, now item (N6, "are")=1 and the back link is linked to item (N6, ",") selected as the largest.

(5) Arc (N1, N6) is matched with "dotted" in the input translation. Since they do not match, the values of item (N6, "dotted") (=0), item (N6, "are") (=1), and item (N1, "dotted") (=0) are checked and the largest one is selected. Thus, now item (N6, "dotted")=1 and the back link is linked to item (N6, "are") selected as the largest.

(6) Arc (N1, N6) is matched with "with" in the input translation. Since they do not match, the values of item (N6, "with") (=0), item (N6, "dotted") (=1), and item (N1, "with") (=0) are checked and the largest one is selected. Thus, now item (N6, "with")=1 and the back link is linked to item (N6, "dotted) selected as the largest.

Matching arc (N2, N3) with the input translation will be described below with reference to FIG. 8.

(1) First, arc (N2, N3) is matched with "In" in the input translation. Since they do not match, the values of item (N3, "In") and item (N2, "In") are checked. Since both of them are "0", item (N3, "In") is kept unchanged and its back link is also kept unchanged.

Figure 8:
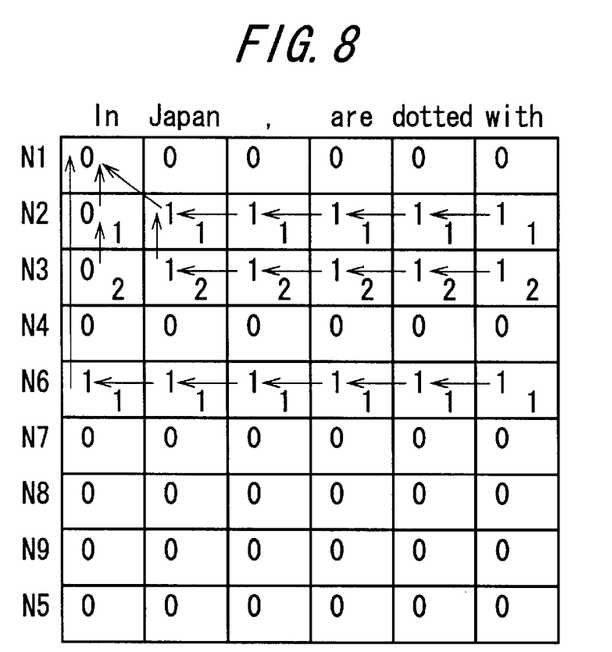
FIG. 8 is a table showing matching the input sentence with the template patterns terminating by an arc (N2, N3)

In the table shown in FIG. 8, the number "2" in the lower right corner of each cell in row N3 represents the total of the scores of words contained in the path from start node N1 to node N3 in FIG. 4, that is, the total of the scores of "Japan" and "is".

(2) Next, arc (N2, N3) is matched with "Japan" in the input translation. Since they do not match, the values of item (N3, "Japan") (=0), item (N3, "In") (=0), and item (N2, "Japan") (=1) are checked and the largest one is selected. Thus, now item (N3, "Japan")=1 and the back link is linked to item (N2, "Japan") selected as the largest.

(3) Arc (N2, N3) is matched with "," in the input translation. Since they do not match, the values of item (N3, ",") (=0), item (N3, "Japan") (=1), and item (N2, ",") (=1) are checked and the largest one is selected. Thus, now item (N3, ",") =1 and the back link is linked to item (N3, "Japan") selected as the largest.

(4) Arc (N2, N3) is matched with "are" in the input translation. Since they do not match, the values of item (N3, "are") (=0), item (N3, ",") (=1), and item (N2, "are") (=1) are checked and the largest one is selected. Thus, now item (N3, "are")=1 and the back link is linked to item (N3, ",") selected as the largest.

(5) Arc (N2, N3) is matched with "dotted" in the input translation. Since they do not match, the values of item (N3, "dotted") (=0), item (N3, "are") (=1), and item (N2, "dotted") (=1) are checked and the largest one is selected. Thus, now item (N3, "dotted")=1 and the back link is linked to item (N3, "are") selected as the largest.

(6) Arc (N2, N3) is matched with "with" in the input translation. Since they do not match, the values of item (N3, "with") (=0), item (N3, "dotted") (=1), and item(N2, "with") (=1) are checked and the largest one is selected. Thus, now item (N3, "with")=1 and the back link is linked to item (N3, "dotted") selected as the largest.

Figure 9:
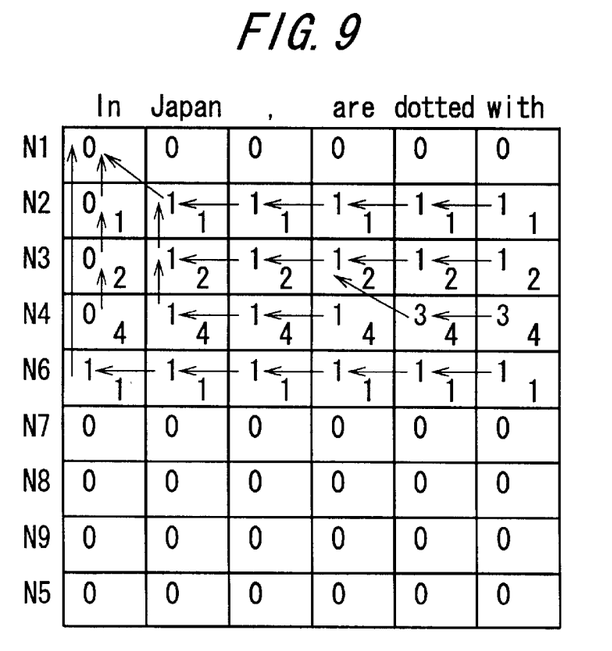
FIG. 9 is a table showing matching the input sentence with the template patterns terminating by an arc (N3, N4)

Matching arc (N3, N4) with the input translation will be described below with reference to FIG. 9.

(1) First, arc (N3, N4) is matched with "In" in the input translation. Since they do not match, the values of item (N4, "In") and item (N3, "In") are checked. Since both of them are "0", item (N4, "In") is kept unchanged and its back link is also kept unchanged In the table shown in FIG. 9, the number "4" in the lower right corner of each cell in row N4 represents the total of the scores of words contained in the path from start node N1 to node N4 in FIG. 4, that is, the total of the scores of "Japan", "is", and "dotted".

(2) Next, arc (N3, N4) is matched with "Japan" in the input translation. Since they do not match, the values of item (N4, "Japan") (=0), item (N4, "In") (=0), and item (N3, "Japan") (=1) are checked and the largest one is selected. Thus, now item (N4, "Japan")=1 and the back link is linked to item (N3, "Japan") selected as the largest.

(3) Arc (N3, N4) is matched with "," in the input translation. Since they do not match, the values of item (N4, ",") (=0), item (N4, "Japan") (=1), and item (N3, ",") (=1) are checked and the largest one is selected. Thus, now item (N4, ",") =1 and the back link is linked to item (N4, "Japan") selected as the largest.

(4) Arc (N3, N4) is matched with "are" in the input translation. Since they do not match, the values of item (N4, "are") (=0), item (N4, ",") (=1), and item (N3, "are") (=1) are checked and the largest one is selected. Thus, now item (N4, "are")=1 and the back link is linked to item (N4, ",") selected as the largest.

(5) Arc (N3, N4) is matched with "dotted" in the input translation. Since they match, the values of item (N4, "dotted") (=0), item (N4, "are") (=1), item (N3, "dotted") (=1), and item (N3, "are")+2 (=3, where "+2" means that the score of "dotted" in FIG. 4 is added) are checked and the largest one is selected. Thus, now item (N4, "dotted")=3 and the back link is linked to item (N3, "are") selected as the largest.

(6) Arc (N3, N4) is matched with "with" in the input translation. Since they do not match, the values of item (N4, "with") (=0), item (N4, "dotted") (=3), and item (N3, "with") (=1) are checked and the largest one is selected. Thus, now item (N4, "with")=3 and the back link is linked to item (N4, "dotted") selected as the largest.

Figure 10:
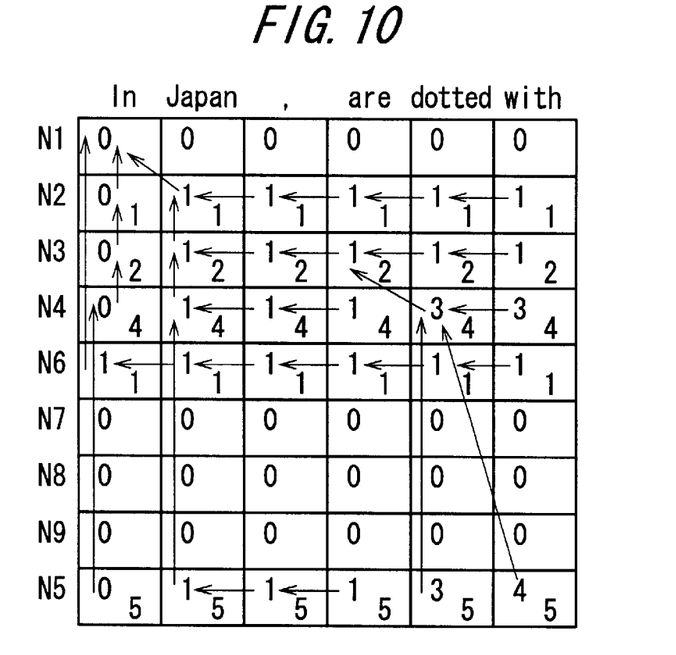
FIG. 10 is a table showing matching the input sentence with the template patterns terminating by an arc (N4, N5)

Matching arc (N4, N5) with the input translation will be described below with reference to FIG. 10.

(1) First, arc (N4, N5) is matched with "In" in the input translation. Since they do not match, the values of item (N5, "In") and item (N4, "In") are checked. Since both of them are "0", item (N5, "In") is kept unchanged and its back link is also kept unchanged In the table shown in FIG. 10, the number "5" in the lower right corner of each cell in row N5 represents the total of the scores of words contained in the path from start node N1 to node N5 in FIG. 4, that is, the total of the scores of "Japan", "is", "dotted", and "with".

(2) Next, arc (N4, N5) is matched with "Japan" in the input translation. Since they do not match, the values of item (N5, "Japan") (=0), item (N5, "In") (=0), and item (N4, "Japan") (=1) are checked and the largest one is selected. Thus, now item (N5, "Japan")=1 and the back link is linked to item (N4, "Japan") selected as the largest.

(3) Arc (N4, N5) is matched with "," in the input translation. Since they do not match, the values of item (N5, ",") (=0), item (N5, "Japan") (=1), and item (N4, ",") (=1) are checked and the largest one is selected. Thus, now item (N5, ",") =1 and the back link is linked to item (N5, "Japan") selected as the largest.

(4) Arc (N4, N5) is matched with "are" in the input translation. Since they do not match, the values of item (N5, "are") (=0), item (N5, ",") (=1), and item (N4, "are") (=1) are checked and the largest one is selected. Thus, now item (N5, "are")=1 and the back link is linked to item (N5, ",") selected as the largest.

(5) Arc (N4, N5) is matched with "dotted" in the input translation. Since they do not match, the values of item (N5, "dotted") (=0), item (N5, "are") (=1), and item (N4, "dotted") (=3) are checked and the largest one is selected. Thus, now item (N5, "dotted")=3 and the back link is linked to item (N4, "dotted") selected as the largest.

(6) Arc (N4, N5) is matched with "with" in the input translation. Since they match, the values of item (N5, "with") (=0), item (N5, "dotted") (=3), item (N4, "with") (=3), and item (N4, "dotted")+1 (=4, where "+1" means that the score of "with" in FIG. 4 is added) are checked and the largest one is selected. Thus, now item (N5, "with")=4 and the back link is linked to item (N4, "dotted") selected as the largest.

Matching arc (N6, N7) with the input translation will be described below with reference to FIG. 11.

(1) First, arc (N6, N7) is matched with "In" in the input translation. Since they do not match, the values of item (N7, "In") (=0) and item (N6, "In") (=1) are checked and the larger one is selected. Thus, now item (N7, "In")=1 and the back link is linked to item (N6, "In") selected.

Figure 11:
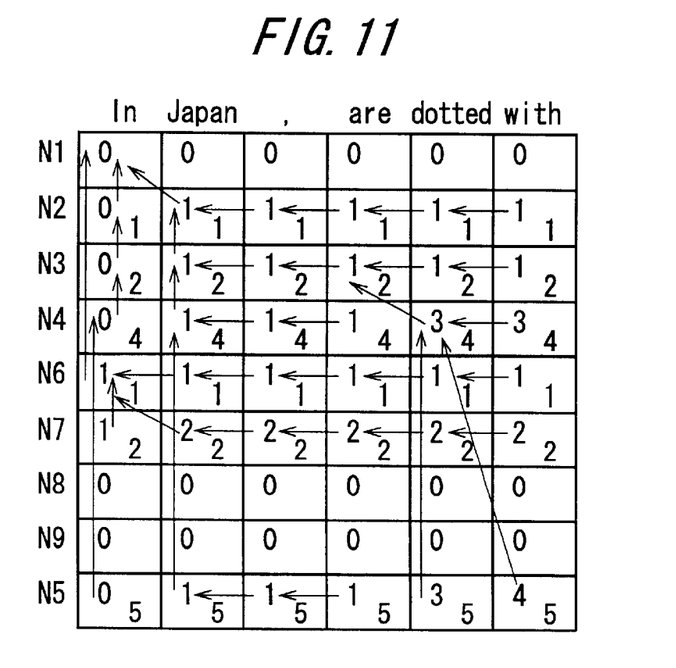
FIG. 11 is a table showing matching the input sentence with the template patterns terminating by an arc (N6, N7)

In the table shown in FIG. 11, the number "2" in the lower right corner of each cell in row N7 represents the total of the scores of words contained in the path from start node N1 to node N7 in FIG. 4, that is, the total of the scores of "In" and "Japan".

(2) Next, arc (N6, N7) is matched with "Japan" in the input translation. Since they match, the value of item (N7, "Japan") (=0), item (N7, "In") (=0), item (N6, "Japan") (=1), and item (N6, "In")+1 (=2, where "+1" means that the score of "Japan" in FIG. 4 is added) are checked and the largest one is selected. Thus, now item (N7, "Japan")=2 and the back link is linked to item (N6, "In").

(3) Arc (N6, N7) is matched with "," in the input translation. Since do not match, the values of item (N7, ",") (=0), item (N7, "Japan") (=2), and item (N6, ",") (=1) are checked and the largest one is selected. Thus, now item (N7, ",")=2 and the back link is linked to item (N7, "Japan") selected as the largest.

(4) Arc (N6, N7) is matched with "are" in the input translation. Since they do not match, the values of item (N7, "are") (=0), item (N7, ",") (=2), and item (N6, "are") (=1) are checked and the largest one is selected. Thus, now item (N7, "are")=2 and the back link is linked to item (N7, ",") selected as the largest.

(5) Arc (N6, N7) is matched with "dotted" in the input translation. Since they do not match, the values of item (N7, "dotted") (=0), item (N7, "are") (=2), and item (N6, "dotted") (=1) are checked and the largest one is selected. Thus, now item (N7, "dotted")=2 and the back link is linked to item (N7, "are") selected as the largest.

(6) Arc (N6, N7) is matched with "with" in the input translation. Since they do not match, the values of item (N7, "with") (=0), item (N7, "dotted") (=2), and item(N6, "with") (=1) are checked and the largest one is selected. Thus, now item (N7, "with")=2 and the back link is linked to item (N7, "dotted") selected as the largest.

Matching arc (N7, N8) with the input translation will be described below with reference to FIG. 12.

(1) First, arc (N7, N8) is matched with "In" in the input translation. Since they do not match, the values of item (N8, "In") (=0) and item (N7, "In") (=1) are checked and the larger one is selected. Thus, now item (N8, "In")=1 and the back link is linked to item (N7, "In") selected.

Figure 12:
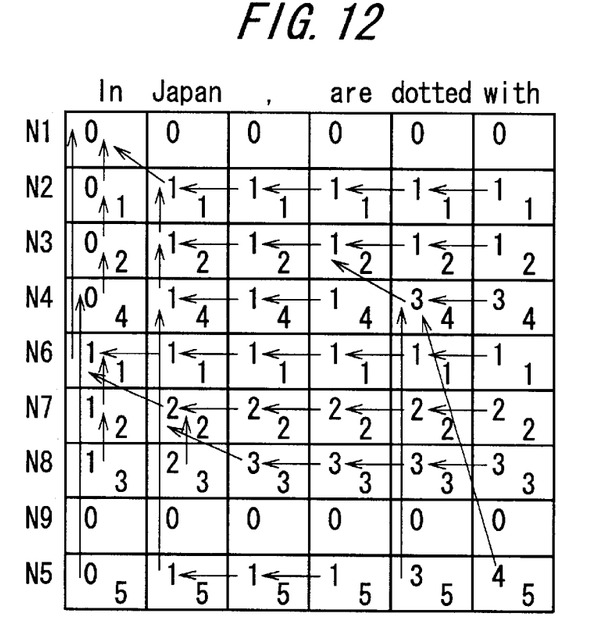
FIG. 12 is a table showing matching the input sentence with the template patterns terminating by an arc (N7, N8)

In the table shown in FIG. 12, the number "3" in the lower right corner of each cell in row N8 represents the total of the scores of words contained in the path from start node N1 to node N8 in FIG. 4, that is, the total of the scores of "In", "Japan", and ",".

(2) Next, arc (N7, N8) is matched with "Japan" in the input translation. Since they do not match, the values of item (N8, "Japan") (=0), item (N8, "In") (=1), and item (N7, "Japan") (=2) are checked and the largest one is selected. Thus, now item (N8, "Japan")=2 and the back link is linked to item (N7, "Japan") selected as the largest.

(3) Arc (N7, N8) is matched with "," in the input translation. Since they match, the value of item (N8, ",") (=0), item (N8, "Japan") (=2), item (N7, ",") (=2), and item (N7, "Japan") +1 (=3, where "+1" means that the score of "," in FIG. 4 is added) are checked and the largest one is selected. Thus, now item (N8, ",")=3 and the back link is linked to item (N7, "Japan") selected as the largest.

(4) Arc (N7, N8) is matched with "are" in the input translation. Since they do not match, the values of item (N8, "are") (=0), item (N8, ",") (=3), and item (N7, "are") (=2) are checked and the largest one is selected. Thus, now item (N8, "are")=3 and the back link is linked to item (N8, ",") selected as the largest.

(5) Arc (N7, N8) is matched with "dotted" in the input translation. Since they do not match, the values of item (N8, "dotted") (=0), item (N8, "are") (=3), and item (N7, "dotted") (=2) are checked and the largest one is selected. Thus, now item (N8, "dotted")=3 and the back link is linked to item (N8, "are") selected as the largest.

(6) Arc (N7, N8) is matched with "with" in the input translation. Since they do not match, the values of item (N8, "with") (=0), item (N8, "dotted") (=3), and item(N7, "with") (=2) are checked and the largest one is selected. Thus, now item (N8, "with")=3 and the back link is linked to item (N8, "dotted") selected as the largest.

Matching arc (N8, N9) with the input translation will be described below with reference to FIG. 13.

(1) First, arc (NB, N9) is matched with "In" in the input translation. Since they do not match, the values of item (N9, "In") (=0) and item (N8, "In") (=1) are checked and the larger one is selected. Thus, now item (N9, "In")=1 and the back link is linked to item (N8, "In") selected.

Figure 13:
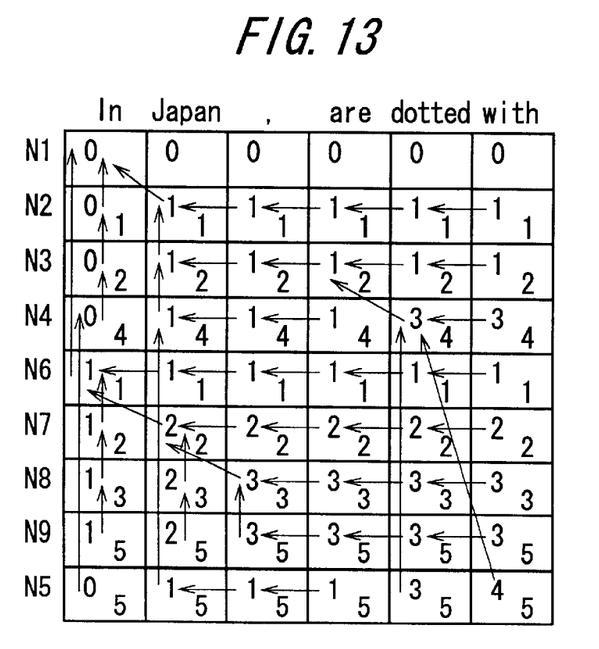
FIG. 13 is a table showing matching the input sentence with the template patterns terminating by an arc (N8, N9)

In the table shown in FIG. 13, the number "5" in the lower right corner of each cell in row N9 represents the total of the scores of words contained in the path from start node N1 to node N9 in FIG. 4, that is, the total of the scores of "In", "Japan", ",", and "there".

(2) Next, arc (N8, N9) is matched with "Japan" in the input translation. Since they do not match, the values of item (N9, "Japan") (=0), item (N9, "In") (=1), and item (N8, "Japan") (=2) are checked and the largest one is selected. Thus, now item (N9, "Japan")=2 and the back link is linked to item (N8, "Japan") selected as the largest.

(3) Arc (N8, N9) is matched with "," in the input translation. Since they do not match, the values of item (N9, ",") (=0), item (N9, "Japan") (=2), and item (N8, ",") (=3) are checked and the largest one is selected. Thus, now item (N9, ",") =3 and the back link is linked to item (N8, ",") selected as the largest.

(4) Arc (N8, N9) is matched with "are" in the input sentence. Since they do not match, the values of item (N9, "are") (=0, item (N9, ",") (=3), and item (N8, "are") (=3) are checked and the largest one is selected. Thus, now item (N9, "are") =3 and the back link is linked to item (N9, ",") selected as the largest.

(5) Arc (N8, N9) is matched with "dotted" in the input sentence. Since they do not match, the values of item (N9, "dotted") (=0), item (N9, "are") (=3), and item (N8, "dotted") (=3) is checked and the largest one is selected. Thus, now item (N9, "dotted")=3 and the back link is linked to item(N9, "are") selected as the largest.

(6) Arc (N8, N9) is matched with "with" in the input translation. Since they do no match, the values of item (N9, "with") (=0), item (N9, "dotted") (=3), and item(N8, "with") (=3) are checked and the largest one is selected. Thus, now item (N9, "with")=3 and the back link is linked to item (N9, "dotted") selected as the largest.

Matching arc (N9, N5) with the input translation will be described below with reference to FIG. 14.

(1) First, arc (N9, N5) is matched with "In" in the input translation. Since they do not match, the values of item (N5, "In") (=0) and item (N9, "In") (=1) are checked and the larger one is selected. Thus, now item (N5, "In")=1 and the back link is linked to item (N9, "In") selected, thus the back link is changed.

Figure 14:
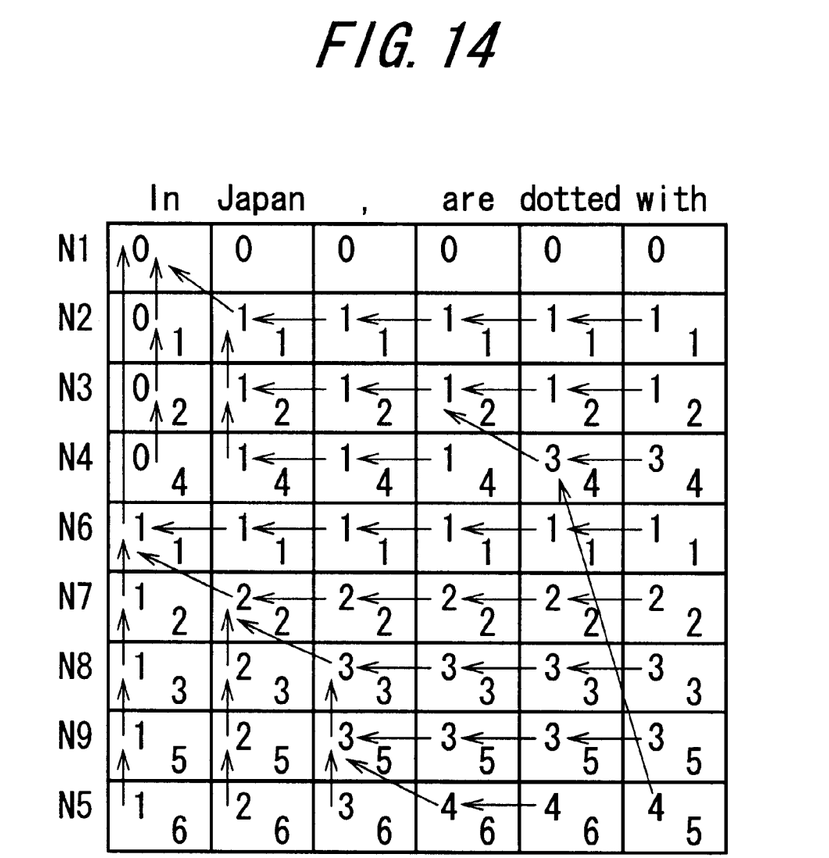
FIG. 14 is a table showing matching the input sentence with the template patterns terminating by an arc (N9, N5).

In the table shown in FIG. 14, the number "6" in the lower right corner of each cell from the first to the fifth columns in row N5 represents the total of the scores of words contained in the character strings in the lower path from start node N1 to node N5 in FIG. 4, that is, the total of the scores of "In", "Japan", ",", "there", and "are".

The number in the cell in the sixth column in row 5 is still "5" rather than "6." The reason for this will be described later in detail.

(2) Arc (N9, N5) is matched with "Japan" in the input translation. Since they do not match, the values of item (N5, "Japan") (=1), item (N5, "In") (=1), and item (N9, "Japan") (=2) are checked and the largest one is selected. Thus, now item (N5, "Japan")=2 and the back link is linked to item (N9, "Japan") selected as the largest, thus, the back link is changed.

(3) Arc (N9, N5) is matched with in the input translation. Since they do not match, the values of item (N5, "In") (=1), item (N5, "Japan") (=2), and item (N9, ",") (=3) are checked and the largest one is selected. Thus, now item (N5, ",") =3 and the back link is linked to item (N9, ","), thus the back link is changed.

(4) Arc (N9, N5) is matched with "are" in the input translation. Since they match, the values of item (N5, "are") (=1), item (N5, ",") (=3), item (N9, "are") (=3), and item (N9, ",")+1 (=4, where "+1" means that the score of "are" in FIG. 4 is added) are checked and the largest one is selected. Thus, item (N5, "are")=4 and the back link is linked to item (N9, ",") selected as the largest, thus the back link is changed.

(5) Arc (N9, N5) is matched with "dotted" in the input translation. Since they do not match, the values of item (N5, "dotted") (=3), item (N5, "are") (=4), and item (N9, "dotted") (=3) are checked and the largest one is selected. Thus, now item (N5, "dotted")=4 and the back link is linked to item (N5, "are") selected as the largest, thus, the back link is changed.

(6) Arc (N9, N5) is matched with "with" in the input translation. Since they do not match, the values of item (N5, "with") (=4), item (N5, "dotted") (=4), and item (N9, "with") (=3) are checked.

Here, if the value of item (N5, "dotted") (=4) is the largest, the back link would be changed and the number in the lower right corner of the cell would be changed to "16", which is the total of scores of changed character strings, as with the cells of the first to fifth columns in the first row N5.

However, the values of item (N5, "dotted") (=4) and original item (N5, "with") (=4) are the same and in such a case the back link is not changed, unless the number in the lower right corner of the cell in row N5 decreases by changing the back link. Thus, item (N5, "with")=4, the back link to item (N4, "dotted") is kept, and the number in the lower right corner of the cell remains "5", which is the total of the scores of character strings in the upper path in FIG. 4.

By the matching described above, an optimum level comparison value, 4/5, of the character strings in the upper path in FIG. 4 and an optimum level comparison value, 4/6, of the character strings in the lower path are provided. Thus, the character strings in the upper path are selected as the optimum template pattern for the input sentence (input translation).

Once the optimum template pattern is determined in this way, the input translation is regarded as templates similar to the optimum template pattern at step S11 in FIG. 3 and the input translation is corrected at step S12. The method for the correction is the same as that in the above described Japanese Patent Laid-Open No. 9-325673 specification.

Thus, because each time a translation is input, a template pattern which is most appropriate for that input translation is constructed, rather than template patterns for a model translation are provided beforehand, a template pattern for the model translation which is most appropriate for the input translation can be obtained.

While in the embodiment described above, correction of Japanese-into-English translation has been described as an example, the present invention equally applied to English-into-Japanese translation and translation between other languages. In addition, as mentioned earlier, the present invention also can be applied to retrieval of given information based on an input sentence in information retrieval systems using, for example, the Internet, by using a template pattern having compound information consisting of natural language sentences as a search key.

As described above, the present invention provides a method for retrieving an optimum template pattern, wherein a set of templates for a model sentence (model translation) is provided beforehand, the set of templates being constructed by arranging a plurality of template blocks containing an arbitrary number of sentence components called states including grammatically correct and/or erroneous components, and a candidate template pattern which is most appropriate for a given input sentence is selected from all the candidate template patterns which can be constructed from the set of template; said method characterized by: assigning scores to all the words in the set of templates according to their importance; calculating an optimum level comparison value each of all the candidate template patterns by taking the total of the scores of all the words used in each candidate template pattern as the denominator and the total of the scores of words in each candidate template pattern which match words in the input sentence as the numerator; and determine as the optimum template pattern a candidate template pattern having the largest optimum level comparison value among optimum level comparison values which provide the largest numerator; thereby the same template pattern as input sentence's template pattern intended by the person who inputted that sentence can be obtained as the optimum template pattern for the model sentence (model translation).

The present invention is further characterized in that: template set storage means for storing a set of templates for a model sentence, the set of templates being constructed by arranging a plurality of template blocks containing an arbitrary number of sentence components called states including grammatically correct and/or erroneous components; input sentence storage means for storing an input sentence; candidate template pattern retrieval means for comparing each of the template blocks in the set of templates with the input sentence and retrieving all the candidate template patterns which can be constructed from the set of templates; candidate template pattern storage means for storing the retrieved candidate template patterns; word score storage means for storing scores assigned to all the words in the set of template according to their importance by associating the scores with the words; matching word retrieval means for retrieving a word which matches a word in the input sentence; total score calculation means for calculating total of the scores of all the words used in each of the candidate template patterns; matching word score calculation means for calculating total of the scores of words in each candidate template pattern which match words in the input sentence; optimum level comparison value calculation means for calculating an optimum level comparison value by taking the total of the scores of all the words in each of the candidate template pattern as the denominator and the total of the scores of words in each candidate template pattern which match words in the input sentence as numerator; and optimum template pattern determination means for comparing the optimum level comparison values of the candidate template patterns to determine a candidate template pattern having the largest optimum level comparison value among optimum level comparison values which provide the largest numerator as the optimum template pattern are provided, thus, candidate template pattern corresponding to any given input sentence can be obtained. In addition, because optimum level comparison values are used to determine and obtain an optimum template pattern from a plurality of candidate template patterns, the problem of the generation of a plurality of optimum template pattern is substantially eliminated.

The present invention causes a computer to perform processes of: storing a set of templates for a model sentence in a memory area, the set of templates being constructed by arranging a plurality of template blocks containing an arbitrary number of sentence components called states including grammatically correct and/or erroneous components; storing an input sentence in the memory area; storing in the memory area scores assigned to all the word in the set of template according to their importance by associating the scores with the word; and, using an optimum level comparison value of each of all the candidate template patterns which is calculated by taking the total of the scores of all the words used in each candidate template pattern as the denominator and the total of the scores of words in each candidate template pattern which matches words in the input sentence as the numerator to determine a candidate template pattern having the largest optimum level comparison value among optimum level values which provide the largest numerator as the optimum template pattern. Thus, the same template pattern as input sentence's template pattern intended by the person who inputted that sentence can be obtained as the optimum template pattern for a model sentence, without providing the template pattern for the model sentence beforehand.

What is claimed is:

1. A method for retrieving an optimum template pattern, wherein a set of templates for a model sentence is provided beforehand, each of said set of templates consists of a plurality of complete sentences, said set of templates being constructed by arranging a plurality of template blocks containing an arbitrary number of sentence components called states including at least one of grammatically correct and erroneous components into said set of templates, each of whose components includes at least one of singles words, phrases, compound word phrases, and sentence segments that consist of a plurality of words, said set of templates being arranged into candidate template patterns for an input sentence, an optimum template pattern which is most appropriate for the input sentence is selected from all the candidate template patterns which can be constructed from the set of templates, the method comprising the steps of:

assigning scores to all words in the set of templates according to their importance as part of template patterns;

calculating an optimum level comparison value of each of all the candidate template patterns by taking a first total of the scores of all words used in each said candidate template pattern as a denominator and a second total of the scores of words in each said candidate template pattern which match words in the input sentence in the same order as a numerator; and determining as the optimum template pattern the candidate template pattern having a largest said optimum level comparison value among the optimum level comparison values which provide a largest said numerator.

2. An apparatus for retrieving an optimum template pattern, comprising:

template set storage means for storing a set of templates for a model sentence, said set of templates being constructed by arranging a plurality of template blocks containing an arbitrary number of sentence components called states including at least one of grammatically correct and erroneous components, each of whose components includes at least one of singles words, phrases, compound word phrases, and sentence segments that consist of a plurality of words;

input sentence storage means for storing an input sentence;

candidate template pattern retrieval means for comparing each of template blocks in the set of templates with the input sentence and retrieving all the candidate template patterns which are complete sentences that can be constructed from the set of templates;

candidate template pattern storage means for storing the retrieved candidate template patterns which are complete sentences;

word score storage means for storing scores assigned to all the words in the set of template according to their importance as part of template patterns by associating the scores with the words;

matching word retrieval means for retrieving a word which matches a word in the input sentence;

total score calculation means for calculating total of the scores of all the words used in each of the candidate template patterns;

matching word score calculation means for calculating total of the scores of words in each candidate template pattern which match words in the input sentence in the same order;

optimum level comparison value calculation means for calculating an optimum level comparison value by taking a first total of the scores of all the words in each of the candidate template pattern as the denominator and a second total of the scores of words in each candidate template pattern which match words in the input sentence in the same order as the numerator; and, optimum template pattern determination means for comparing the optimum level comparison values of the candidate template patterns to determine a candidate template pattern having the largest optimum level comparison value among optimum level comparison values which provide the largest numerator as the optimum template pattern.

3. A computer-readable recording medium on which a program is recorded for causing a computer to perform the steps of:

storing a set of templates for a model sentence in a memory area, said set of templates being constructed by arranging a plurality of template blocks containing an arbitrary number of sentence components called states including at least one of grammatically correct and erroneous components;

storing an input sentence in the memory area;

storing in the memory scores assigned to all the words in the set of template according to their importance as a part of template patterns in the memory area by associating the scores with the word; and, using an optimum level comparison value of each of all the candidate template patterns which is calculated by taking a first total of the scores of all the words used in each candidate template pattern as the denominator and a second total of the scores of words in each candidate template pattern which matches words in the input sentence in the same order as the numerator to determine a candidate template pattern having the largest optimum level comparison value among optimum level values which provide the largest numerator.

* * * * *